(12) United States Patent
Li

(10) Patent No.: US 10,366,502 B1
(45) Date of Patent: Jul. 30, 2019

(54) VEHICLE HEADING PREDICTION NEURAL NETWORK

(71) Applicant: Waymo LLC, Mountain View, CA (US)

(72) Inventor: Congcong Li, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 102 days.

(21) Appl. No.: 15/374,884

(22) Filed: Dec. 9, 2016

(51) Int. Cl.
| | |
|---|---|
| *G06K 9/00* | (2006.01) |
| *G05D 1/00* | (2006.01) |
| *G06T 7/50* | (2017.01) |
| *G06N 3/04* | (2006.01) |
| *G06N 3/08* | (2006.01) |
| *G06T 7/73* | (2017.01) |
| *B60R 1/00* | (2006.01) |
| *G05D 1/02* | (2006.01) |

(52) U.S. Cl.
CPC ............ *G06T 7/50* (2017.01); *B60R 1/00* (2013.01); *G05D 1/0088* (2013.01); *G06K 9/00805* (2013.01); *G06N 3/04* (2013.01); *G06N 3/08* (2013.01); *G06T 7/73* (2017.01); *B60R 2300/30* (2013.01); *G05D 1/0202* (2013.01); *G05D 1/0206* (2013.01); *G05D 1/0212* (2013.01); *G06T 2207/10028* (2013.01); *G06T 2207/20081* (2013.01); *G06T 2207/20084* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 5,311,600 | A | 5/1994 | Aghajan et al. |
| 5,640,468 | A | 6/1997 | Hsu |
| 6,404,920 | B1 | 6/2002 | Hsu |
| 8,649,932 | B2 | 2/2014 | Mian et al. |
| 9,229,102 | B1 | 1/2016 | Wright et al. |
| 9,275,308 | B2 | 3/2016 | Szegedy et al. |
| 10,235,771 | B2 * | 3/2019 | Rad ............... G06T 7/73 |
| 2005/0013486 | A1 | 1/2005 | Wiedemann et al. |
| 2010/0100275 | A1 | 4/2010 | Mian et al. |

(Continued)

OTHER PUBLICATIONS

Khosroshahi, A.—"Surround Vehicles Trajectory Analysis with Recurrent Neural Networks"—IEEE—Nov. 1-4, 2016—pp. 2267-2272.*

(Continued)

*Primary Examiner* — Bernard Krasnic
(74) *Attorney, Agent, or Firm* — Fish & Richardson P.C.

(57) ABSTRACT

Methods, systems, and apparatus, including computer programs encoded on computer storage media, for generating vehicle heading predictions from point cloud data using a neural network. One of the methods includes receiving a plurality of different projections of point cloud data, wherein the point cloud data represents different sensor measurements of electromagnetic radiation reflected off a vehicle. Each of the plurality of projections of point cloud data is provided as input to a neural network subsystem trained to receive projections of point cloud data for a vehicle and to generate one or more vehicle heading classifications as an output. At the output of the neural network subsystem, one or more vehicle heading predictions is received.

21 Claims, 4 Drawing Sheets

(56) References Cited

U.S. PATENT DOCUMENTS

| | | | |
|---|---|---|---|
| 2010/0169009 A1 | 7/2010 | Breed et al. | |
| 2012/0050021 A1 | 3/2012 | Rao et al. | |
| 2012/0300078 A1 | 11/2012 | Ogata et al. | |
| 2013/0250112 A1 | 9/2013 | Breed | |
| 2014/0210644 A1 | 7/2014 | Breed | |
| 2014/0368493 A1* | 12/2014 | Rogan | G06K 9/00201 345/419 |
| 2014/0368807 A1* | 12/2014 | Rogan | G01S 17/50 356/28 |
| 2015/0055821 A1 | 2/2015 | Fotland | |
| 2017/0039436 A1* | 2/2017 | Chen | G06K 9/00798 |

OTHER PUBLICATIONS

Geiger, A.—"Vision meets Robotics: The KITTI Dataset"—International Journal of Robotics Research, 2013, pp. 1-6.*
Li, B.—"Vehicle Detection from 3D Lidar Using Fully Convolutional Network"—arXiv—Aug. 29, 2016—pp. 1-8 (Year: 2016).*
Rivals et al. "Real-Time control of an autonomous vehicle: a neural network approach to the path following problem," $5^{th}$ International Conference on Neural Networks and their Application, 1993, 11 pages.
Chen et al. "Deepdriving: Learning affordance for direct perception in autonomous driving," Proceedings of the IEEE International Conference on Computer Vision, 2015, 9 pages.
Pomerleau. "Neural network vision for robot driving," The Handbook of Brain Theory and Neural Networks, 1996, 22 pages.
'princeton.edu' [online]. "Deep Learning for Self-driving Car," [retrieved Dec. 21, 2016] Retrieved from the Internet: URL<http://www.princeton.edu/~alaink/Orf467F14/Deep%20Driving.pdf> 32 pages.

* cited by examiner

VEHICLE HEADING PREDICTION NEURAL NETWORK

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles use movement detection or road graphs to predict the heading of nearby vehicles. To determine a vehicle heading using movement detection, the position of a vehicle, e.g., as detected by an on-board camera, can be compared over multiple time slices. However, detecting movement of vehicles can be unreliable when vehicles are moving at very slow speeds relative to one another.

A road graph is data that represents the lanes of roads in a particular geographic location and their associated direction of travel. Thus, to determine a vehicle heading using a road graph, the location of a vehicle within a particular lane can be determined, and then the heading determined from the direction of travel associated with that particular lane. However, a road graph is not available for all possible vehicle locations. For example, the road graph typically does not cover parking spaces along the sides of roads.

Some autonomous vehicles have on-board computer systems that implement neural networks for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameter values can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more parameters that define one or more filters for each layer, with each filter having one or more parameters. A convolutional neural network layer generates an output by performing a convolution of each neuron's filter with the layer's input.

In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Convolutional neural networks employ weight sharing so that all neurons in a depth sublayer have the same weights. This provides for translation invariance when detecting features in the input.

Convolutional neural networks can also include fully-connected layers and other kinds of layers. Neurons in fully-connected layers receive input from each neuron in the previous neural network layer.

SUMMARY

This specification describes how a computer system can implement a fully-learned neural network to make vehicle heading predictions from projections of vehicle point cloud data. In other words, the system can make vehicle heading predictions from the physical shape of vehicles without requiring the vehicle to be moving and without requiring road graph data.

In general, one innovative aspect of the subject matter described in this specification can be embodied in methods that include the actions of receiving a plurality of different projections of point cloud data, wherein the point cloud data represents different sensor measurements of electromagnetic radiation reflected off a vehicle; providing each of the plurality of projections of point cloud data as input to a neural network subsystem trained to receive projections of point cloud data for a vehicle and to generate one or more vehicle heading classifications as an output; and receiving, at the output of the neural network subsystem, one or more vehicle heading predictions. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The neural network subsystem comprises a neural network having a plurality of point cloud subnetworks that each operate on a different respective projection of the point cloud data. Each point cloud subnetwork includes a convolutional stack having one or more convolutional layers. The neural network comprises a camera subnetwork that operates on camera image data. The camera subnetwork includes a convolutional stack having one or more convolutional layers. The neural network includes a concatenation layer that combines the outputs of each of the point cloud subnetworks and the camera subnetwork. The output of the neural network subsystem is one or more directions, each direction having a score. The output of the neural network is multiple components of a single direction. The point cloud data comprises a plurality of points representing an intensity and a position of electromagnetic radiation reflected off the vehicle. The neural network subsystem is trained to generate a vehicle heading classification from learned physical shape information for a plurality of different vehicle types.

Particular embodiments of the subject matter described in this specification can be implemented so as to realize one or more of the following advantages. An autonomous or semi-autonomous vehicle system can use a neural network subsystem to make vehicle heading predictions. A vehicle can use a neural network subsystem designed for speed and real-time processing to quickly make vehicle heading predictions in a production system. The neural network can incorporate camera data as well as point cloud data for making vehicle heading predictions. The neural network allows a vehicle to make accurate vehicle heading predictions even when the vehicle is moving slowly or not at all as well as when road graph information is not available. The heading predicted by the neural network can be further used to infer other characteristics, e.g., whether or not a vehicle is traveling in reverse.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a neural network to make heading predictions for nearby vehicles using sensor point cloud data. In other words, the neural network can use the physical shape or physical features of the vehicle itself, as reflected by the sensor point cloud data, to make a vehicle heading prediction. A heading prediction indicates a direction in which a particular vehicle is likely to be oriented in a particular coordinate system. A heading prediction can be represented as a single direction; as a distribution of directions, each with a corresponding likelihood score; as multiple components of a single direction; or in any other appropriate representation.

Figure 1:
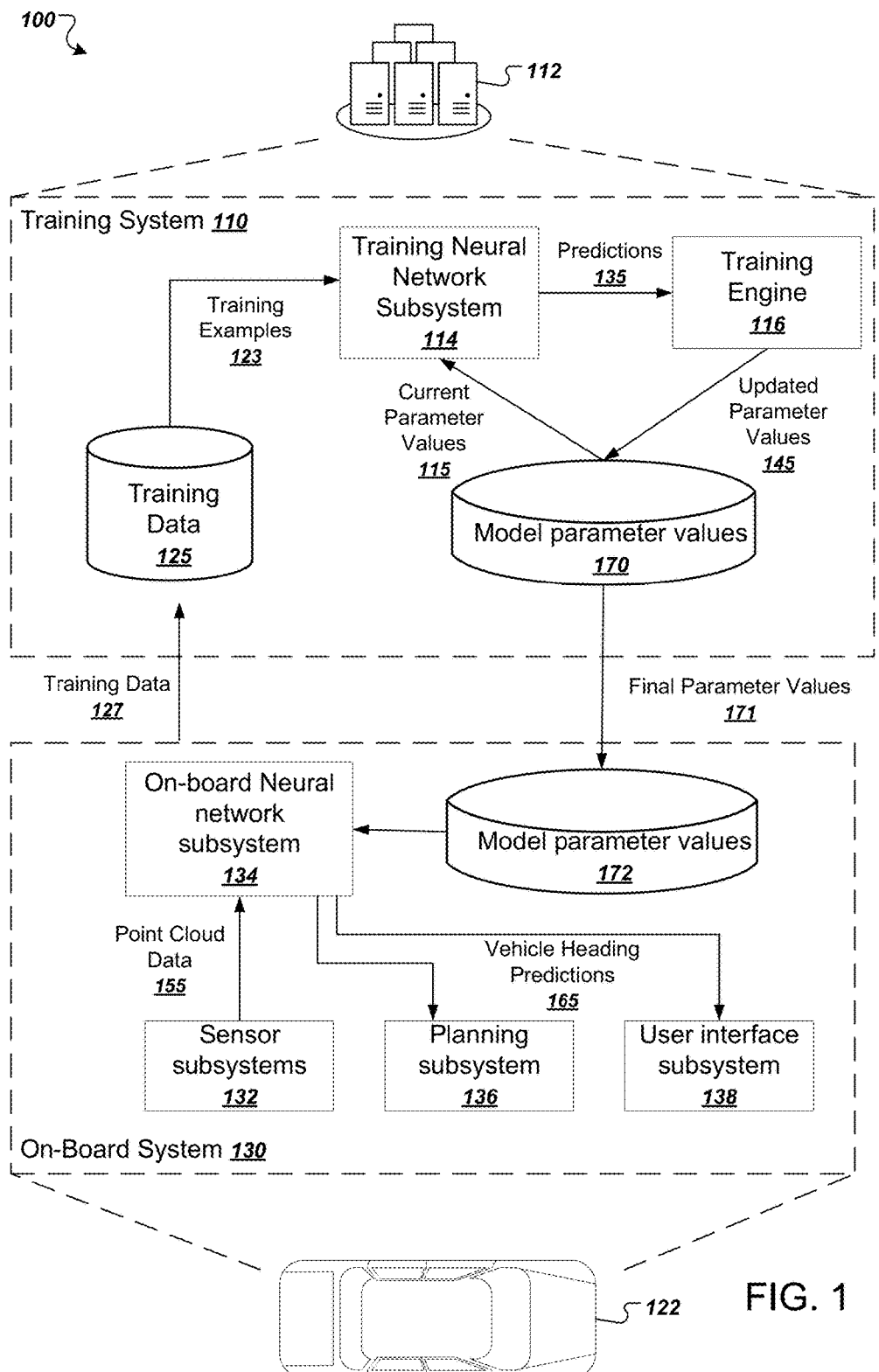
FIG. 1 is a diagram of an example system.

FIG. 1 is a diagram of an example system 100. The system 100 includes a training system 110 and an on-board system 130.

The on-board system 130 is physically located on-board a vehicle 122. The vehicle 122 in FIG. 1 is illustrated as an automobile, but the on-board system 130 can be located onboard any appropriate vehicle type. The vehicle 122 can be a fully autonomous vehicle that uses vehicle heading predictions to inform fully-autonomous driving decisions. The vehicle 122 can also be a semi-autonomous vehicle that uses vehicle heading predictions to aid a human driver. For example, the vehicle 122 can autonomously apply the brakes if a prediction indicates that a human driver is about to collide with another vehicle.

The on-board system 130 includes one or more sensor subsystems 132. The sensor subsystems include a combination of components that receive reflections of electromagnetic radiation, e.g., lidar systems that detect reflections of laser light, radar systems that detect reflections of radio waves, and camera systems that detect reflections of visible light.

The raw input sensor data indicates a distance, a direction, and an intensity of reflected radiation. Each sensor can transmit one or more pulses of electromagnetic radiation in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 can also classify groups of one or more raw sensor measurements as being measures of another vehicle. Each group of raw sensor measurements can be represented as three-dimensional point cloud, with each point having an intensity and a position. In some implementations, the position is represented as a range and elevation pair.

The sensor-subsystems 132 provide the point cloud data 155 to an on-board neural network subsystem 134. The on-board neural network system uses the point cloud data 155 to make one or more vehicle heading predictions 165.

The on-board neural network subsystem 134 implements the operations of each layer of a neural network trained to make the vehicle heading predictions 165. Thus, the on-board neural network subsystem 134 includes one or more computing devices having software or hardware modules that implement the respective operations of each layer of the neural network according to an architecture of the neural network.

The on-board neural network subsystem 134 can implement the operations of each layer of the neural network by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or of another kind of specialized computing device. In other words, not all operations of each layer need to be performed by central processing units (CPUs) of the on-board neural network subsystem 134.

The on-board neural network subsystem 134 uses the point cloud data 155 to generate one or more vehicle heading predictions 165. Each vehicle heading prediction specifies one or more directions in which a nearby vehicle is likely to be facing. The on-board neural network subsystem 134 can provide the one or more vehicle heading predictions 165 to a planning subsystem 136, a user interface subsystem 138, or both.

When a planning subsystem 136 receives the one or more vehicle heading predictions 165, the planning subsystem 136 can use the one or more vehicle heading predictions 165 to make fully-autonomous or semi-autonomous driving decisions. For example, the planning subsystem 136 can generate a fully-autonomous plan to avoid a vehicle that is backing out of a parking space. As another example, the planning subsystem 136 can generate a semi-autonomous recommendation for a human driver to apply the brakes when a vehicle is backing out of a parking space.

A user interface subsystem 138 can receive the vehicle heading predictions 165 and can generate a user interface presentation that indicates the locations of nearby vehicles and their associated headings. For example, the user interface subsystem 138 can generate a user interface presentation having image or video data containing a representation of the regions of space that are likely to be occupied by vehicles and can orient the vehicles in that space using their predicted headings. An on-board display device can then display the user interface presentation for view by passengers of the vehicle 122.

The on-board neural network subsystem 134 can also use the point cloud data 155 to generate training data 127. The on-board system 130 can provide the training data 127 to the training system 110 in offline batches or in an online fashion, e.g., continually whenever it is generated.

To generate the training data 127, the on-board system 130 can generate training examples having one or more projections of point cloud data for a vehicle. The training data 127 generated by the on-board system 130 can then be labeled with a heading by human labelers. Alternatively, the on-board system 130 can automatically generate a heading for the training data 127 from vehicles whose heading can be determined by the on-board system 130. For example, the on-board system 130 may be able to determine a reliable heading for vehicles that are moving above a threshold speed in a particular direction.

The advantage to having training data 127 generated automatically by the on-board system 130 is that the resulting neural network can learn to predict headings from the physical features of many different types of vehicles. For example, many fully autonomous or semi-autonomous vehicles can be deployed to generate training data for all vehicles encountered during a particular time period.

The training system 110 is typically hosted within a data center 112, which can be a distributed computing system having hundreds or thousands of computers in one or more locations.

The training system 110 includes a training neural network subsystem 114 that can implement the operations of each layer of a neural network that is designed to make vehicle heading predictions from point cloud data. The training neural network subsystem 114 includes a plurality of computing devices having software or hardware modules that implement the respective operations of each layer of the neural network according to an architecture of the neural network.

The training neural network generally has the same architecture and parameters as the on-board neural network. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The neural network subsystem 114 can receive training examples 123 as input. Each of the training examples 123 includes one or more projections generated from vehicle point cloud data as well as a label that indicates a heading for the vehicle. Each of the training examples 123 can also include camera images as well. As mentioned above, each of the training examples 123 can be labeled by a human labeler or automatically by the on-board system 130.

The training neural network subsystem 114 can generate, for each training example 123, one or more vehicle heading predictions 135. A training engine 116 analyzes the vehicle heading predictions 135 and compares the vehicle heading predictions to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of parameter values 171 to the on-board system 120 for use in making vehicle heading predictions 165 for fully autonomous or semi-autonomous driving decisions. The training system 110 can provide the final set of model parameter values 171 by a wired or wireless connection to the on-board system 120.

Figure 2:
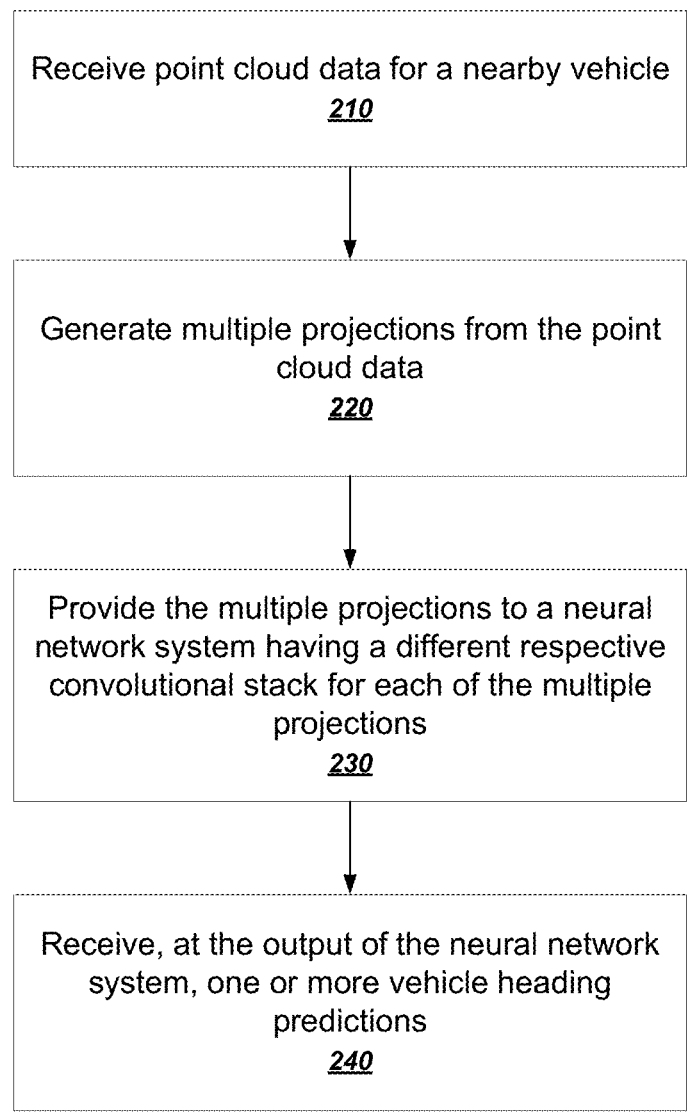
FIG. 2 is a flow chart of an example process for computing a vehicle heading prediction from projections of input sensor data.

FIG. 2 is a flow chart of an example process for computing a vehicle heading prediction from projections of input sensor data. The example process in FIG. 2 uses a forward inference pass through a neural network trained to make vehicle heading predictions. The example process can thus be used during training or to make predictions from unlabeled input, e.g., in a production system. The process will be described as being performed by an appropriately programmed neural network system.

The system receives point cloud data for a nearby vehicle (210). As described above, the point cloud data includes one or more sensor measurements that have been classified as belonging to a nearby vehicle. Each measurement indicates a three-dimensional position and optionally, an intensity.

The system generates multiple projections from the point cloud data (220). In general, each projection is a mapping of the point cloud data onto a particular projection plane. The system can generate the projections using multiple different projection planes that represent different views of the nearby vehicle. For example, the system can generate projections representing a back left view, a back right view, and a top-down view, to name just a few examples.

If the process is being performed by an on-board system, e.g., the on-board system 130 of FIG. 1, the on-board system can receive the point cloud data and generate the corresponding projections. If the process is being performed during training, the projections may have already been generated from the point cloud data.

The system provides the multiple projections to a neural network system having a different respective convolutional stack for each of the multiple projections (230). A convolutional stack is a sequence of one or more convolutional layers. The system can pass each of the multiple projections through a different one of the convolutional stacks.

The system receives, at the output of the neural network system, one or more vehicle heading predictions (240). The system can combine the results from the multiple convolutional stacks and generate one or more vehicle heading predictions.

The neural network system can be configured to generate any appropriate representation of a vehicle heading. For example, each heading prediction can include a direction of orientation in a particular coordinate system and a score representing the likelihood for the direction. For example, the system can generate a direction in a top-down coordinate system corresponding to cardinal directions.

In some implementations, the system defines a plurality of possible heading classes and classifies the vehicle's heading into one or more of the heading classes. For example, the system can define classes that correspond to particular heading angles. For the cardinal directions, the system can define four heading classes. The system can further subdivide the cardinal directions by any appropriate amount, e.g., into 8, 16, or 32 heading classes. The result of the classification is then a distribution of predicted classifications, with the most likely heading having the highest likelihood.

If multiple vehicle heading classifications were generated, the system can also compute a final vehicle heading from the multiple heading classifications. For example, the system can compute a mean for circular quantities from all of the different heading classifications. The system can use any appropriate technique for combining multiple circular components into a single component.

Instead of multiple direction classifications, the neural network system can also be configured to generate multiple components of a vehicle heading. For example, the output of the neural network can be a sine and a cosine of the heading angle. The system can then compute a final vehicle heading from the multiple components generated by the neural network.

After generating the vehicle heading predictions, the system can take different actions depending on whether the forward inference pass is being used for training or in a production system. For example, an onboard system can use the heading classification to make fully autonomous or semi-autonomous driving decisions. For example, if the system determines that a vehicle is traveling in a different direction than it is facing, the system can determine that the vehicle is reversing.

During training, the heading predictions can be used to compute one or more errors based on the labels in the training example used. The errors can be used to compute updated weights for the neural network, which can be computed and updated using any appropriate training technique, e.g., stochastic gradient descent with backpropagation.

Figure 3:
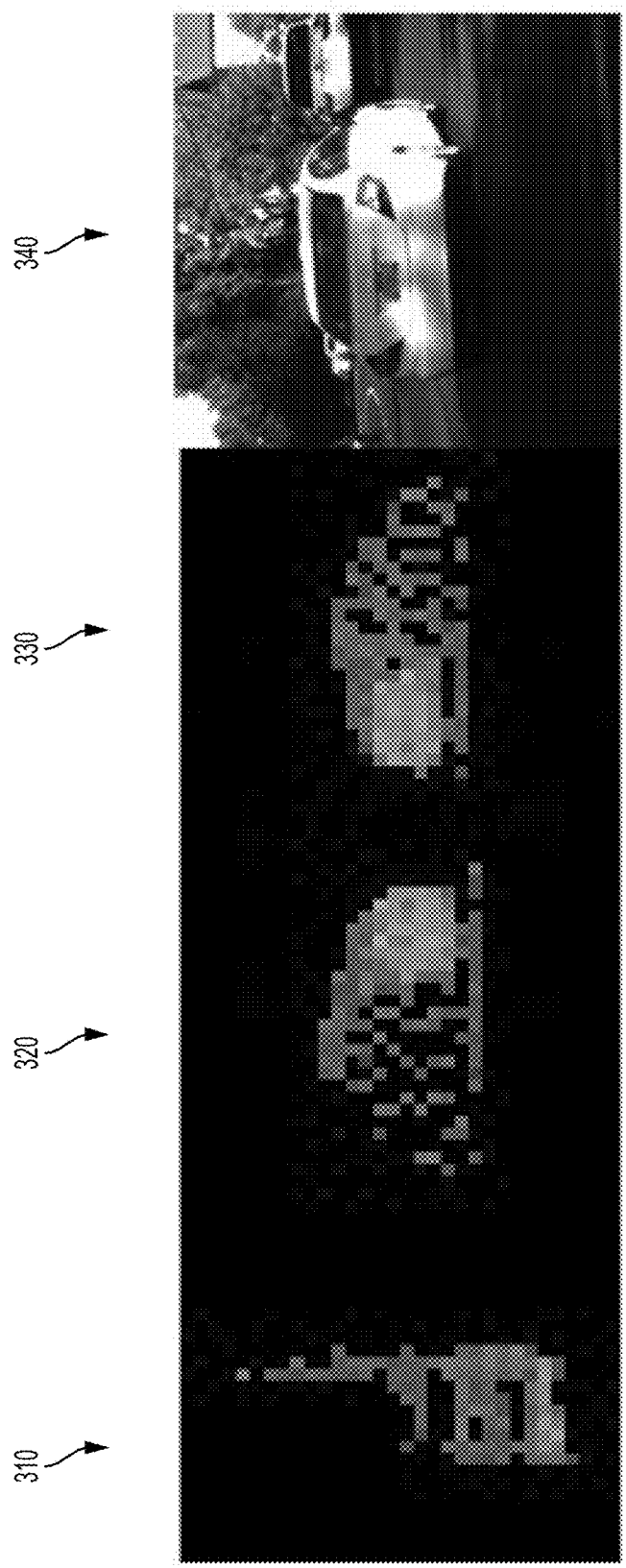
FIG. 3 illustrates various projections generated from point-cloud data.

FIG. 3 illustrates various projections generated from point-cloud data. A camera image 340 illustrates a white car. An on-board sensor subsystem can make multiple sensor measurements and generate point cloud data that is classified as belonging to the white car. A system can then generate multiple projections from the point cloud data.

A first type of projection is a top-down projection 310. A top-down projection is a projection of the point cloud data onto a region surrounding the vehicle from a location above the vehicle itself. The projection plane for a top-down projection is thus substantially parallel to the surface on which the vehicle is standing. The top-down projection 310 includes some empty space in the top-left, which is indicative of unobservable space for that projection plane.

FIG. 3 also illustrates two different perspective projections 320 and 330. A perspective projection is a projection of the point cloud data onto a plane in front of, behind, or to the side of the vehicle.

The projection 320 is a perspective projection with the projection plane situated to the back left of the white car. The projection 330 is a perspective projection with the projection plane situated to the back right of the white car. In this projection, the intensity of the electromagnetic reflections is typically the most intense off the back of the car, which is information that will be reflected in intensity of the points in the point cloud data.

The system can represent each projection as a matrix of data, with each element of the matrix corresponding to a location on the projection plane. Each element of the matrix can have a respective value representing the intensity of the sensor measurement for that point. The system may, but need not, represent each projection with image data in an image format. In some implementations, the system uses different pixel color channels to represent the different aspects of the point cloud data. For example, the system can use RGB color values to represent intensity, range, and elevation, respectively for each point in the projection of point cloud data.

Figure 4:
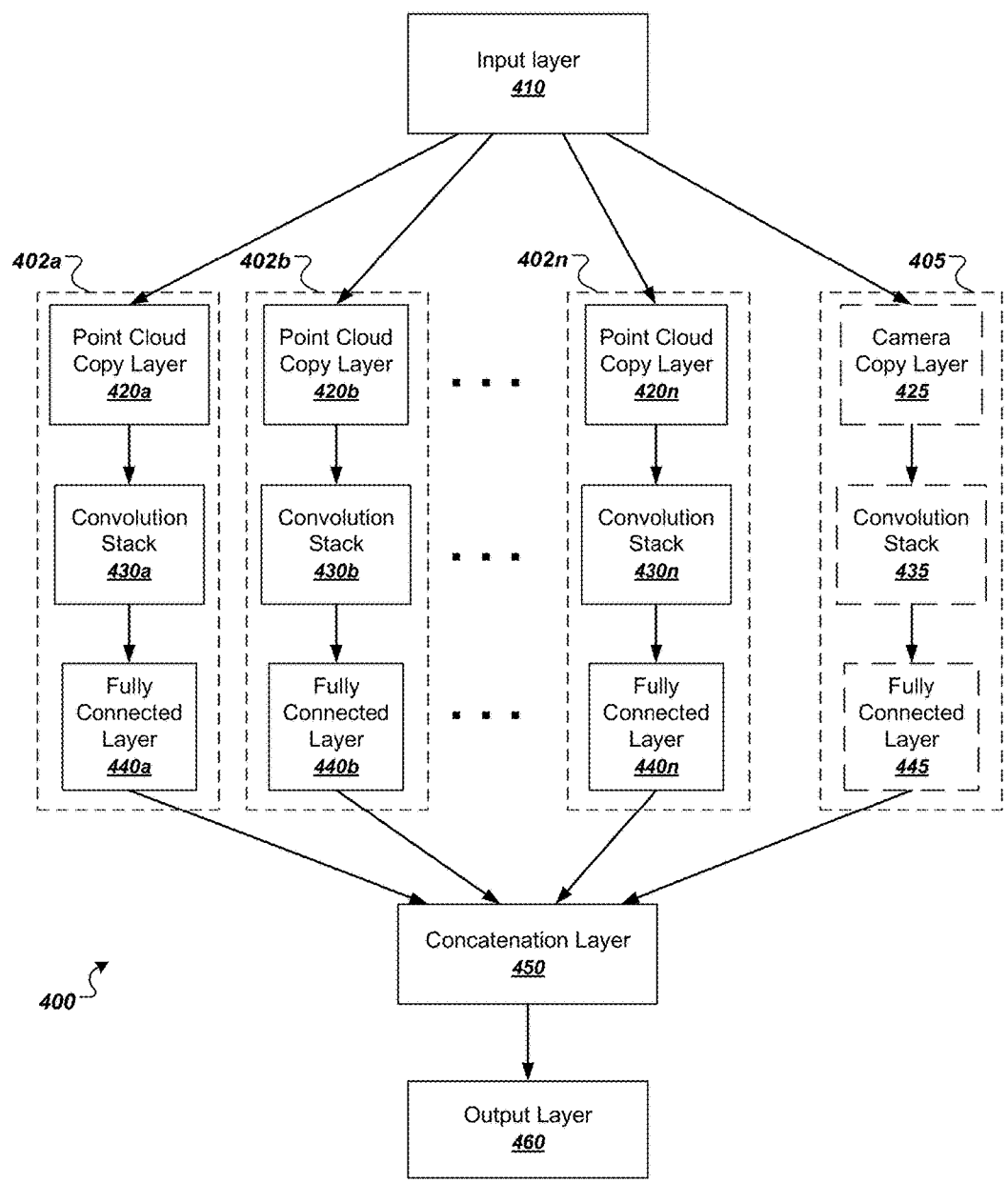
FIG. 4 illustrates an example architecture of a neural network for making vehicle heading predictions from multiple projections of point cloud data for a vehicle.

FIG. 4 illustrates an example architecture of a neural network 400 for making vehicle heading predictions from multiple projections of point cloud data for a vehicle.

The neural network 400 includes an input layer 410, a plurality of point cloud subnetworks 402*a-n*, a concatenation layer 450, and an output layer 460. The neural network 400 also optionally includes a camera subnetwork 405.

The input layer 410 generates or operates on a different respective projections of point cloud data, as described above. In other words, the input layer 410 can generate the different projections from the point cloud data to generate an output, or the input layer 410 can merely process previously generated projections to generate an output suitable for further processing by the network 400.

Each of the point cloud subnetworks 402*a*, 402*b*, through 402*n* operate on different respective projections of point cloud data. The network 400 can include any appropriate number of point cloud subnetworks.

Each point cloud subnetwork includes a point cloud copy layer, e.g., point cloud copy layers 420*a*, 420*b*, through 420*n*; a convolution stack, e.g., convolution stacks 430*a*, 430*b*, through 430*n*; and a fully connected layer, e.g., fully connected layers 440*a*, 440*b*, through 440*n*.

Each point cloud copy layer copies the appropriate projections from the output of the input layer 410.

Each point cloud subnetwork also includes a convolution stack, e.g., convolution stacks 430*a*, 430*b*, through 430*n*.

Each convolution stack includes one or more convolutional layers. Each convolutional layer has filters that are defined by learned parameter values. Each point cloud subnetwork can include any appropriate number of convolutional layers in its convolution stack. Fewer layers will reduce the required processing time, while more convolutional layers allow the system to learn more complicated vehicle representations. Thus, to optimize for speed, the convolution stacks 430a-n may include 1, 2, or 5 convolutional layers, to name just a few examples. To optimize for complicated vehicle representations, the convolution stack can include additional convolutional layers. In addition, all point cloud subnetworks need not include the same number of convolutional layers. For example, perspective projections may require more complicated processing than top-down projections. Thus, in some implementations, point cloud subnetworks that process perspective projections have more convolutional layers than point cloud subnetworks that process top-down projections.

Each point cloud subnetwork can also include a fully connected layer. Each neuron of each fully connected layer receive inputs from all neurons at the output of the convolution stack.

The network 400 can also include a camera subnetwork 405. The camera subnetwork 405 processes camera images rather than projections of point cloud data. The camera subnetwork can have the same or similar components as the point cloud subnetworks. For example, the camera subnetwork 405 can include a camera copy layer 425 that copies camera data from the input layer 410, a convolution stack 435 with one or more convolutional layers that process the camera image data, and a fully connected layer 445.

The concatenation layer 450 receives the outputs of all the point cloud subnetworks 402a-n and, optionally, the camera subnetwork 405. The concatenation layer 450 then generates a concatenated representation of all of the received outputs.

The output layer 460 receives the output of the concatenation layer 450 and generates one or more vehicle heading predictions. In some implementations, unlike the convolutional stacks, the output layer 460 is a fully connected layer.

The output layer 460 has parameters that define filters for the particular output task. For example, if the network 400 is designed to perform a classification task that generates one or more direction classifications, each filter can represent a different heading class. For example, the output layer 460 can have 4, 8, 16, or 32 filters to represent different heading classes. The output layer 460 receives the concatenated representation from the concatenation layer 450 and uses the filters to compute a score distribution for each of one or more headings. Alternatively, if the network 400 is designed to perform a regression task that generates values for multiple components of a vehicle heading, e.g., a sine and a cosine as described above, each filter can represent a different component of the vehicle heading.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   receiving, by a first vehicle including on-board sensors, point cloud data representing sensor measurements of electromagnetic radiation reflected off a second vehicle and captured by a first on-board sensor of the first vehicle;
   generating a plurality of different projections of the point cloud data representing the sensor measurements captured by the first on-board sensor, wherein each projection of the plurality of different projections is a mapping of the point cloud data onto a different projection plane of a plurality of projection planes, and wherein each different projection plane represents a different view of the second vehicle;
   providing each of the plurality of different projections of the point cloud data as input to a neural network subsystem trained to receive projections of point cloud data for the second vehicle and to generate one or more second vehicle classifications as an output; and
   receiving, at the output of the neural network subsystem, the one or more second vehicle classifications for the second vehicle, wherein each second vehicle classification indicates a current direction in which the second vehicle is likely to be oriented at a current time in a particular coordinate system.

2. The method of claim 1, wherein the neural network subsystem comprises a neural network having a plurality of point cloud subnetworks that each operate on a different respective projection of the point cloud data.

3. The method of claim 2, wherein each point cloud subnetwork includes a convolutional stack having one or more convolutional layers.

4. The method of claim 3, wherein the neural network comprises a camera subnetwork that operates on camera image data.

5. The method of claim 4, wherein the camera subnetwork includes a convolutional stack having one or more convolutional layers.

6. The method of claim 4, wherein the neural network includes a concatenation layer that combines the outputs of each of the point cloud subnetworks and the camera subnetwork.

7. The method of claim 1, wherein the one or more second vehicle classifications include a respective score for each of one or more directions.

8. The method of claim 1, wherein the one or more second vehicle classifications identify multiple components of a single direction.

9. The method of claim 1, wherein the point cloud data comprises a plurality of points representing an intensity and a position of electromagnetic radiation reflected off the second vehicle.

10. The method of claim 1, wherein the neural network subsystem is trained to generate the one or more second vehicle classifications from learned physical shape information for a plurality of different vehicle types.

11. A system comprising:
one or more computers and one or more storage devices storing instructions that, when executed by the one or more computers, cause the one or more computers to perform operations comprising:
receiving, by a first vehicle including on-board sensors, point cloud data representing sensor measurements of electromagnetic radiation reflected off a second vehicle and captured by a first on-board sensor of the first vehicle;
generating a plurality of different projections of the point cloud data representing the sensor measurements captured by the first on-board sensor, wherein each projection of the plurality of different projections is a mapping of the point cloud data onto a different projection plane of a plurality of projection planes, and wherein each different projection plane represents a different view of the second vehicle;
providing each of the plurality of different projections of the point cloud data as input to a neural network subsystem trained to receive projections of point cloud data for the second vehicle and to generate one or more second vehicle classifications as an output; and
receiving, at the output of the neural network subsystem, the one or more second vehicle classifications for the second vehicle, wherein each second vehicle classification indicates a current direction in which the second vehicle is likely to be oriented at a current time in a particular coordinate system.

12. The system of claim 11, wherein the neural network subsystem comprises a neural network having a plurality of point cloud subnetworks that each operate on a different respective projection of the point cloud data.

13. The system of claim 12, wherein each point cloud subnetwork includes a convolutional stack having one or more convolutional layers.

14. The system of claim 13, wherein the neural network comprises a camera subnetwork that operates on camera image data.

15. The system of claim 14, wherein the camera subnetwork includes a convolutional stack having one or more convolutional layers.

16. The system of claim 14, wherein the neural network includes a concatenation layer that combines the outputs of each of the point cloud subnetworks and the camera subnetwork.

17. The system of claim 11, wherein the one or more second vehicle classifications include a respective score for each of one or more directions.

18. The system of claim 11, wherein the one or more second vehicle classifications identify multiple components of a single direction.

19. The system of claim 11, wherein the point cloud data comprises a plurality of points representing an intensity and a position of electromagnetic radiation reflected off the second vehicle.

20. The system of claim 11, wherein the neural network subsystem is trained to generate the one or more second vehicle classifications from learned physical shape information for a plurality of different vehicle types.

21. A computer program product, encoded on one or more non-transitory computer storage media, comprising instructions that when executed by one or more computers cause the one or more computers to perform operations comprising:
receiving, by a first vehicle including on-board sensors, point cloud data representing sensor measurements of electromagnetic radiation reflected off a second vehicle and captured by a first on-board sensor of the first vehicle;
generating a plurality of different projections of the point cloud data representing the sensor measurements captured by the first on-board sensor, wherein each projection of the plurality of different projections is a mapping of the point cloud data onto a different projection plane of a plurality of projection planes, and wherein each different projection plane represents a different view of the second vehicle;
providing each of the plurality of different projections of the point cloud data as input to a neural network subsystem trained to receive projections of point cloud data for the second vehicle and to generate one or more second vehicle classifications as an output; and
receiving, at the output of the neural network subsystem, the one or more second vehicle classifications for the second vehicle, wherein each second vehicle classification indicates a current direction in which the second vehicle is likely to be oriented at a current time in a particular coordinate system.

* * * * *